July 2, 1929.  C. J. McCARTHY ET AL  1,719,797
AIRPLANE
Filed Feb. 4, 1928
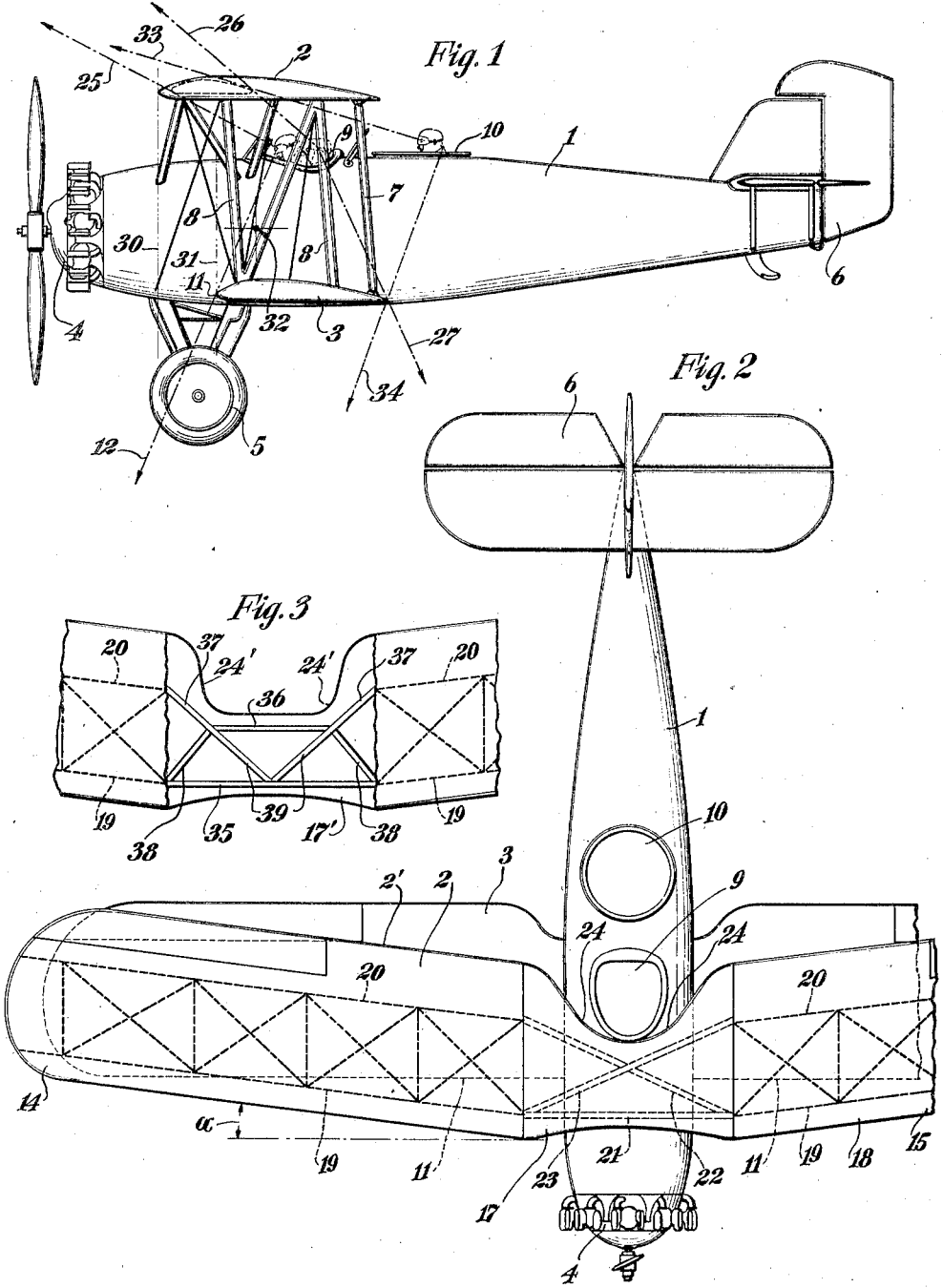

Patented July 2, 1929.

1,719,797

UNITED STATES PATENT OFFICE.

CHARLES J. McCARTHY, OF FLUSHING, AND MICHAEL WATTER, OF NEW YORK, N. Y., ASSIGNORS TO CHANCE M. VOUGHT, OF GREAT NECK, NEW YORK.

AIRPLANE.

Application filed February 4, 1928. Serial No. 251,846.

This invention relates to airplanes and particularly airplanes of the bi- or multi-plane type for use in naval and military operations.

The object of this invention generally is an airplane structure of the biplane type particularly suitable for naval and military operations and peculiarly capable of meeting the demands of unobstructed vision both in front and to the rear of the craft, together with good maneuverability and all round performance, and especially an air plane structure in which these characteristics are obtained in a particularly desirable manner.

For a better understanding of the invention, reference may be had to the accompanying drawings forming a part of this application and containing one embodiment thereof, wherein—

Fig. 1 is a side view of an airplane embodying the invention,

Fig. 2 is a plan view thereof, and

Fig. 3 is a view showing a modified structure.

Referring to the drawings, the invention is illustrated as embodied in a biplane including a fuselage or main body 1, the upper and lower wings 2 and 3, a power plant 4, a landing gear 5 and a tail control structure 6. The lower wing 3 is mounted substantially on the lower level of the fuselage 1 and the upper wing 2 is mounted above the fuselage 1 and a suitable interplane bracing system including the braces 7 and 8 is provided. The fuselage is provided with two cockpits 9 and 10 arranged very closely together, the cockpit 9 being disposed intermediate the trailing and leading edges of the lower wing 3 and extending to a point approaching the leading edge 11 of the wing whereby the pilot in the cockpit has a perfect unobstructed vision over the side of the fuselage in front of the lower wing 3 and almost vertically downward as indicated by the line 12. The wing 3 is designed and constructed so as to have the desired aero-dynamic characteristics together with good control and maneuverability of the craft and is indicated as having substantially no sweep back characteristic. The upper wing 2 is disposed in a position substantially in advance of the lower wing 3 or staggered forwardly with reference thereto, so that while the cockpit 9 is disposed well forward of the rear edge of the lower wing 3 it is disposed to the rearward of the trailing edge 2′ of the upper wing 2, giving a full substantially unobstructed vision rearwardly and upwardly. The forward stagger of the upper wing is indicated between the vertical lines 30—31. In order to effect the desired aero-dynamic balance the upper wing 2 has each of its end sections 14 and 15 swept back at a pronounced angle, alpha, so as to have a gradually decreasing stagger toward the wing tips and to bring the center of lift in its proper relation to the center of gravity 32 and in the particular embodiment shown the sweep back is sufficient to bring the greater portion of the wing 2 substantially vertically above the straight lower wing 3, the wing structure being continuous from tip to tip. The center section 17 of the wing 2 is disposed immediately above the fuselage 1 and is formed separately from the end sections but joined thereto to form a rigid continuation thereof. Each of the end sections 14 and 15 is provided with the usual internal wing frame structure including the forward wing beams 19 and the rearward wing beams 20 with suitable cross bracing as indicated. The intermediate section 17, however, is formed of a special internal structure including a front beam 21 which joins and is disposed substantially in line with the front beams 19 of the end wing sections and two diagonal beams 22 and 23, these beams being arranged in the form of a cross and extending diagonally across from the ends of the beams 19 to the ends of the opposite beams 20 on the other side of the craft. This forms a very satisfactory and rigid structure for the intermediate section 17 and a firm foundation for the end sections, and enables the removal of a substantial section 24 from the rear of the intermediate section 17 so as to leave the cockpit 9 in an entirely unobstructed position, the pilot therein being able to obtain vision directly upward and forward as well as rearward. By this construction and arrangement a thoroughly feasible and practical aero-dynamic construction is obtained with not only an unobstructed vision obliquely forward over either side of the fuselage between lines 12 and 25, but also a rearward vision substantially unobstructed between the lines 26 and 27, it being possible to obtain a vision from the forward pilot's cockpit not only directly upward but even forwardly in the upward direction, as indicated by the line 26, this greater range of vision being effected by the forward stagger of the upper wing and also by the particular construction of the lower wing permitting the disposition of the cockpit in the favorable position indicated. Moreover this fore and aft vision from the cockpit 9 is obtained without the necessity for increasing the size of the cockpit beyond the usual size and without necessitating any extended movements of the pilot's head in the forward and rearward directions, and this arrangement permits the location of the rear cockpit 10 substantially closer to the center of gravity 32, thereby giving not only an undiminished gun-range over the top wing and rearwardly of the craft from the cockpit 10, but resulting also in the reduction of the longitudinal moment of inertia due to the weight in the rear cockpit and enabling the increase of load carried thereby without adversely affecting the balance and control. Moreover this construction renders possible a substantial reduction of weight of the airplane structure and a reduction in size of the tail necessary for proper control. The rear cockpit is capable of being positioned so far forward as to be in line with the trailing edge of the lower plane as indicated. It is observed that the gunner in the cockpit 10 has a clear and unobstructed shooting or observing range to the rear approaching 270°, as indicated by the lines 33 and 34.

It is observed that the center section 17, although forming a rigid structural continuation of the outer panels, is of a different aerodynamic characteristic from that of the outer panels, this being for the purpose of using a wing curve particularly suitable and efficient for the shorter chord at the center.

In the particular embodiment shown, the angle of sweep back of the upper wing 2 is approximately 7°, but it is understood that the applicants are not limited to any particular sweep back.

In Fig. 3 we have indicated a slightly modified construction of upper wing including a center section 17' having a different form of truss from that of section 17, but still a truss whose members lie in general a very substantial distance ahead of a line joining the rear beams of the outer panels but form a rigid structural part thereof, thereby enabling the use of a short chord at the center. In this embodiment there is a forward beam or truss member 35 disposed transversely of the line of flight and joining the fore beams of the outer panels, an aft beam or truss 36, truss members 37 and 38 joining the ends of beam 36 to the adjacent ends of outer panel beams 19 and 20, and diagonal truss members 39 joining the ends of 36 to the middle of beam 35. In the particular embodiment shown the members 39 form continuations of members 37.

We claim:

1. An airplane of the multi-plane type including a fuselage or main body, a lower supporting wing having substantially no sweepback, an upper wing having its central part staggered forwardly with reference to the lower wing and its end sections swept back so as to have a gradually decreasing stagger with reference to the lower wing towards the tips, the central section of the upper wing including an internal truss structure rigidly joining the end sections and lying a substantial distance ahead of a line joining the rear edges of the central frame structures of the end sections, with a fairing formed about the truss structure so as to form a hollowed out portion in the rear thereof and in line with the rear edges of said central frame structures.

2. An airplane of the character set forth in claim 1 wherein the central section of the upper wing is of a different aerodynamic characteristic from that of the outer panels and of a form corresponding to and especially suitable for the shorter chord of the center section.

3. An airplane wing having its frame formed of a central section and two end sections, the central section being staggered forwardly with reference to the end sections, said end sections comprising wing frame structures having fore and aft beams or wing frame members disposed substantially transversely of the line of flight and said center section comprising a truss system rigidly joining the outer panel structures and lying a substantial distance ahead of the line joining the aft beams of the outer panels and a fairing formed about said center section so as to form a hollowed out portion in the rear thereof and in line with the aft beams of the end sections.

4. An airplane of the biplane type including a fuselage and a main body having a cockpit or compartment disposed intermediate its ends, a lower supporting wing extending transversely of the fuselage and disposed beneath the level of the upper surface thereof with the cockpit or compartment disposed intermediate the fore and aft edges thereof, an upper wing extending transversely of the fuselage and above the upper level thereof, said upper wing being divided into a central section and two end sections, the intermediate section being staggered forwardly with reference to the lower wing and the two sections being swept back so as to have a gradually decreasing stagger toward the wing tips, the two end sections comprising a frame with longitudinally extending fore and aft beams therein, and the intermediate section having a front beam substantially in line with the beams at the leading edges of the two end sections and a pair of diagonally arranged beams extending from the ends of said front beam to the ends of the aft beams of the sections and said intermediate wing section being cut away at the rear edge within the cross formed by the diagonal beams whereby the cockpit is entirely exposed.

5. An airplane of the biplane type including a fuselage or main body with a cockpit or compartment intermediate its ends, a lower supporting wing extending transversely of the fuselage and disposed beneath the level of the upper surface thereof with said cockpit disposed intermediate the fore and aft edges thereof, an upper wing extending transversely of the fuselage and above the level thereof, said upper wing having its frame formed of a central section and two end sections, the central section being staggered forwardly with reference to the lower wing, the end sections of the wing being swept back so as to have a gradually decreasing stagger toward the wing tips, said end sections comprising frames having fore and aft beams arranged transverse to the line of flight, and said central section comprising a truss system rigidly joining said beams and including diagonal truss members which lie a substantial distance ahead of a line joining the aft beams of the outer panel and a fairing formed about said center section so as to leave a hollow in the rear thereof in line with said aft beams and immediately above said cockpit.

6. An airplane of the multi-plane type including a fuselage or main body with a cockpit disposed intermediate its ends, a supporting wing extending transversely of the fuselage and beneath the level of the upper surface thereof with a cockpit disposed intermediate the fore and aft edges thereof, an upper wing extending transversely of the fuselage and above the upper level thereof, said upper wing having its frame formed of a central section and two end sections, the central section being staggered forwardly with reference to the lower wing and the end sections being swept back so as to have a gradually decreasing stagger toward the wing tips, said end sections comprising wing frame structures having fore and aft beams or frame members disposed transversely of the line of flight, and said center section comprising a truss system rigidly joining the outer panel structures and lying a substantial distance ahead of the line joining the aft beams of the outer panels and a fairing formed about said center section so as to form a hollowed out portion in the rear thereof and in line with the aft beams of the end sections.

7. An airplane of the multi-plane type including a fuselage or main body with a cockpit disposed intermediate its ends, a supporting wing extending transversely of the fuselage and beneath the level of the upper surface thereof with a cockpit disposed in said fuselage intermediate the fore and aft edges of said supporting wing, an upper wing extending transversely of the fuselage and above the upper level thereof, said upper wing having its frame formed of a central section and two end sections, the center section being staggered forwardly with reference to the lower wing and the end sections being swept back so as to have a gradually decreasing stagger toward the wing tips, said end sections comprising internal wing frame structures of a definite fore and aft span and said center section comprising a truss system rigidly joining the internal frame structures of the outer panels so as to form a continuous rigid structure, said truss system having a fore and aft span of substantially less width than the span of the outer panel frame structures with its central rear part lying a substantial distance ahead of the line joining the rear edges of the internal frame structures of the outer panels and a fairing formed about said central section so as to form a hollowed out portion in the rear thereof and in line with the rear edges of the said internal frame structure.

8. An airplane of the character set forth in claim 7 wherein the truss system of the central section includes two or more diagonal truss members joining the forward edges of the internal frame structures of the outer panels to the rear edges thereof.

9. An airplane of the character set forth in claim 7 wherein the central section is of a different areo-dynamic characteristic from that of the outer panels and of a form corresponding to and especially suitable for the shorter chord of the center section.

In testimony whereof, we have signed our names to this specification.

CHARLES J. McCARTHY.
MICHAEL WATTER.

CERTIFICATE OF CORRECTION.

Patent No. 1,719,797.  Granted July 2, 1929, to

CHARLES J. McCARTHY ET AL.

It is hereby certified that error appears in the printed specification of the above numbered patent requiring correction as follows: Page 2, line 120, claim 4, after the word "two" insert the word "end"; and that the said Letters Patent should be read with this correction therein that the same may conform to the record of the case in the Patent Office.

Signed and sealed this 30th day of July, A. D. 1929.

M. J. Moore,
Acting Commissioner of Patents.

(Seal)